US012801228B2

(12) United States Patent
Li et al.

(10) Patent No.: US 12,801,228 B2
(45) Date of Patent: Nov. 17, 2026

(54) TOUCHPAD DEVICE

(71) Applicant: Chicony Electronics Co., Ltd., New Taipei City (TW)

(72) Inventors: Po-Hsin Li, New Taipei City (TW); Min-Yuan Chen, New Taipei City (TW); Chien-Shuo Chen, New Taipei City (TW)

(73) Assignee: CHICONY ELECTRONICS CO., LTD., New Taipei City (TW)

( * ) Notice: Subject to any disclaimer, the term of this patent is extended or adjusted under 35 U.S.C. 154(b) by 0 days.

(21) Appl. No.: 19/202,780

(22) Filed: May 8, 2025

(65) Prior Publication Data

US 2026/0140578 A1 May 21, 2026

(30) Foreign Application Priority Data

Nov. 18, 2024 (TW) ................................ 113144332

(51) Int. Cl.

| | |
|---|---|
| ***G06F 3/0354*** | (2013.01) |
| ***G06F 3/01*** | (2006.01) |
| ***G06F 3/038*** | (2013.01) |
| ***H01H 13/52*** | (2006.01) |

(52) U.S. Cl.

CPC .......... *G06F 3/03547* (2013.01); *G06F 3/017* (2013.01); *G06F 3/038* (2013.01); *H01H 13/52* (2013.01)

(58) Field of Classification Search

CPC ...... G06F 3/03547; G06F 3/017; G06F 3/038; H01H 13/52

See application file for complete search history.

(56) References Cited

U.S. PATENT DOCUMENTS

| | | | | |
|---|---|---|---|---|
| 10,990,140 | B2 * | 4/2021 | Chang | G06F 1/169 |
| 11,435,839 | B2 * | 9/2022 | Li | G06F 3/03547 |
| 11,520,383 | B1 * | 12/2022 | Li | G06F 1/1658 |
| 11,941,190 | B1 * | 3/2024 | Chu | G06F 1/1643 |
| 12,293,030 | B2 * | 5/2025 | Li | G06F 3/03547 |
| 12,379,792 | B2 * | 8/2025 | Okuni | G06F 3/0213 |
| 12,443,296 | B2 * | 10/2025 | Okuni | G06F 3/044 |
| 12,443,297 | B2 * | 10/2025 | Okuni | G06F 3/03547 |
| 12,504,837 | B2 * | 12/2025 | Shao | G06F 3/03547 |

(Continued)

FOREIGN PATENT DOCUMENTS

| | | |
|---|---|---|
| TW | 202435026 A | 9/2024 |
| TW | I857846 B | 10/2024 |

*Primary Examiner* — Michael J Jansen, II

(74) *Attorney, Agent, or Firm* — MUNCY, GEISSLER, OLDS & LOWE, P.C.

(57) ABSTRACT

A touchpad device includes a substrate, a touch panel, a balancing assembly, and a reinforcement component. The touch panel has an outer periphery and an inner surface. The outer periphery has a first corner, a second corner, a third corner, and a fourth corner, and a switch is on a central region of the inner surface. The balancing assembly is disposed between the touch panel and the substrate, and the balancing assembly includes a first balancing bar, a second balancing bar, a third balancing bar, and a fourth balancing bar. The reinforcement component includes a main plate and a plurality of limiting convex plates, the main plate is disposed on the inner surface of the touch panel, and the limiting convex plates are connected to a periphery of the main plate and protrude from the outer periphery of the touch panel.

18 Claims, 12 Drawing Sheets

(56) References Cited

U.S. PATENT DOCUMENTS

| | | | | |
|---|---|---|---|---|
| 2015/0185779 | A1* | 7/2015 | Doi | G06F 1/1662<br>181/207 |
| 2020/0026325 | A1* | 1/2020 | Chang | G06F 1/169 |
| 2022/0171475 | A1* | 6/2022 | Li | G06F 3/03547 |
| 2022/0365557 | A1* | 11/2022 | Li | G06F 1/169 |
| 2024/0361850 | A1* | 10/2024 | Li | G06F 3/03547 |
| 2025/0036218 | A1* | 1/2025 | Okuni | G06F 3/03547 |
| 2025/0036219 | A1* | 1/2025 | Okuni | G06F 1/169 |
| 2025/0036220 | A1* | 1/2025 | Okuni | G06F 3/03547 |
| 2025/0155997 | A1 | 5/2025 | Li et al. | |
| 2025/0173007 | A1* | 5/2025 | Shao | G06F 3/03547 |

* cited by examiner

TOUCHPAD DEVICE

CROSS-REFERENCE TO RELATED APPLICATION

This non-provisional application claims priority under 35 U.S.C. § 119(a) to Patent Application No. 113144332 filed in Taiwan, R.O.C. on Nov. 18, 2024, the entire contents of which are hereby incorporated by reference.

BACKGROUND

Technical Field

The instant disclosure relates to an input device, in particular, to a touchpad device.

Related Art

Touchpads are common input devices widely applied in computers. The touchpad is provided for sensing the movement or pressing of a user's finger(s) to control the cursor to perform an action (e.g., to move, to click, or the like).

SUMMARY

A touchpad known to the inventor has a touch panel and a substrate. The touch panel has a pivot side, and the touch panel is pivotally fixed on the substrate through the pivot side. When a portion of the touch panel away from the pivot side is pressed, the touch panel swings downward with respect to the substrate by taking the pivot side as the swing axis so as to generate corresponding signal(s).

However, when the user operates the touch panel, the user cannot always accurately press the portion of the touch panel away from the pivot side. As a result, when the user presses the pivot side of the touch panel or a region or a corner of the touch panel adjacent to the pivot side, the touch panel cannot be moved downward smoothly to generate corresponding signals. Moreover, the user cannot operate the touch panel conveniently and the operation feeling of the user will be affected.

In view of this, in one embodiment, a touchpad device is provided. The touchpad device comprises a substrate, a touch panel, a balancing assembly, and a reinforcement component. The touch panel is disposed above the substrate, and the touch panel has an outer periphery and an inner surface. The inner surface faces the substrate, the outer periphery has a first corner, a second corner, a third corner, and a fourth corner, the inner surface has a central region, and a switch is on the central region. The balancing assembly is disposed between the touch panel and the substrate, and the balancing assembly comprises a first balancing bar, a second balancing bar, a third balancing bar, and a fourth balancing bar. Two ends of the first balancing bar are respectively adjacent to the switch and the first corner, two ends of the second balancing bar are respectively adjacent to the switch and the second corner, two ends of the third balancing bar are respectively adjacent to the switch and the third corner, and two ends of the fourth balancing bar are respectively adjacent to the switch and the fourth corner. The reinforcement component comprises a main plate and a plurality of limiting convex plates, the main plate is disposed on the inner surface of the touch panel, and the limiting convex plates are connected to a periphery of the main plate and protrude from the outer periphery of the touch panel.

Based on the above, in the touchpad device according to one or some embodiments of the instant disclosure, the switch is disposed on the central region of the inner surface of the touch panel, the two ends of the first balancing bar of the balancing assembly are respectively adjacent to the switch and the first corner of the touch panel, the two ends of the second balancing bar of the balancing assembly are respectively adjacent to the switch and the second corner of the touch panel, the two ends of the third balancing bar of the balancing assembly are respectively adjacent to the switch and the third corner of the touch panel, and the two ends of the fourth balancing bar of the balancing assembly are respectively adjacent to the switch and the fourth corner of the touch panel. Therefore, during the operation of the touchpad device, when any portion of the touch panel (for example, the corner or the edge of the touch panel) is pressed, the pressing force can be directly and quickly transmitted to the switch through the balancing assembly, and the switch can be moved downward to provide the user with a proper operation feeling. Moreover, the issues of excessive wobbling, bending, or empty stroke of the touch panel generated upon the corner or the edge of the touch panel is pressed can be prevented.

Moreover, in the touchpad device according to one or some embodiments of the instant disclosure, the main plate of the reinforcement component is disposed on the inner surface of the touch panel and the limiting convex plates of the reinforcement component protrude from the outer periphery of the touch panel. Therefore, the structural strength of the touch panel can be further increased. Hence, the issues of excessive wobbling, bending, or empty stroke of the touch panel generated upon the corner or the edge of the touch panel is pressed can be prevented. Furthermore, when the touch panel is pressed, the triggering of the switch can be achieved more quickly.

BRIEF DESCRIPTION OF THE DRAWINGS

The disclosure will become more fully understood from the detailed description given herein below for illustration only, and thus not limitative of the disclosure, wherein.

DETAILED DESCRIPTION

Figure 1:
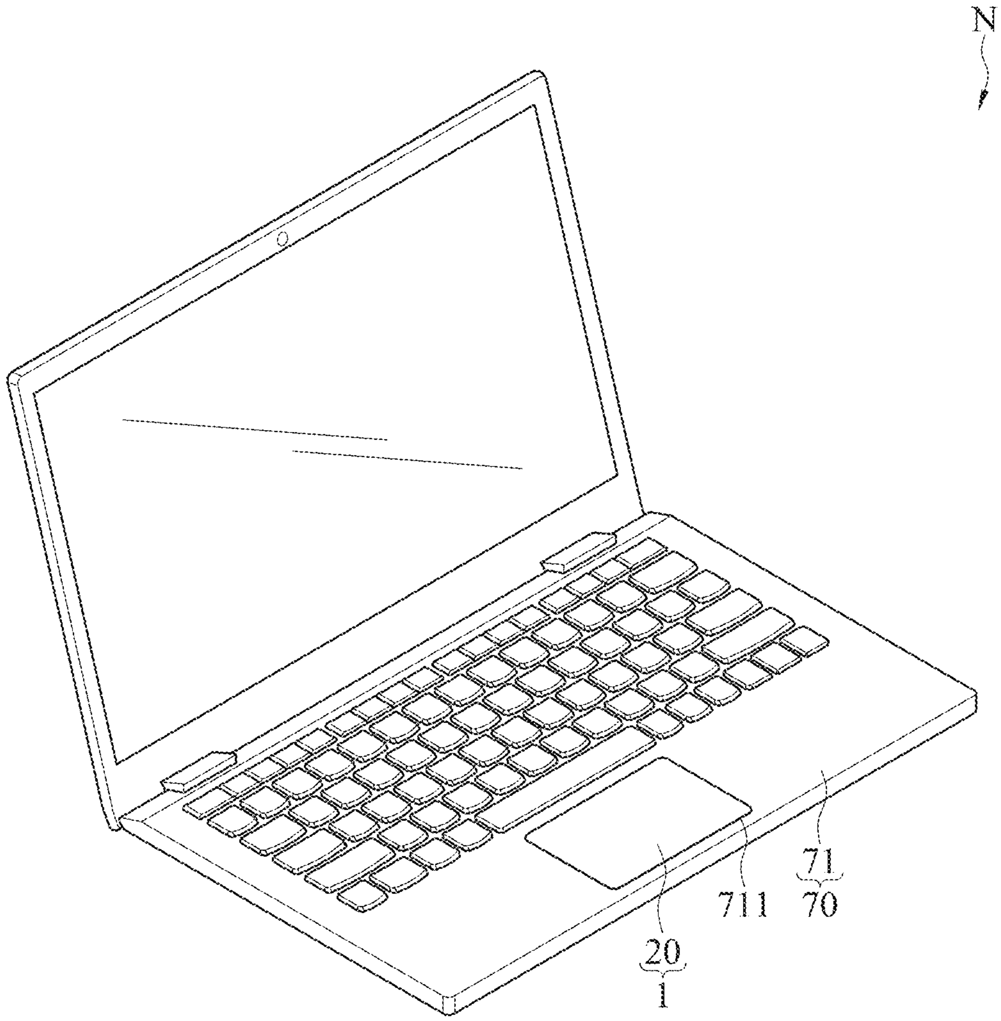
FIG. 1 illustrates a schematic application view of a touchpad device according to an exemplary embodiment of the instant disclosure.

It should be noted that, in the descriptions for the embodiments, the ordinal numbers, e.g., "first," "second," "third," and "fourth" are respectively used to describe different elements, and these elements are not limited due to the use of these ordinal numbers. Furthermore, for the sake of convenience and clarity, the thickness or size of each component in the drawings is exaggerated, omitted, or schematically expressed for the purpose of understanding and reading by persons having ordinary skills in the art, and the size of each component is not the actual size of the component and is not intended to limit the conditions under which the instant disclosure can be implemented, and thus the size of the component does not have substantive technical meaning. Moreover, it is understood that, any structural modifications, changes in proportions, or adjustments in size should still fall within the scope of the technical content disclosed in the instant disclosure without affecting the effects that can be produced and the purposes that can be achieved by the instant disclosure. Moreover, in all the drawings, the same reference numbers are used to indicate the same or similar elements.

Figure 2:
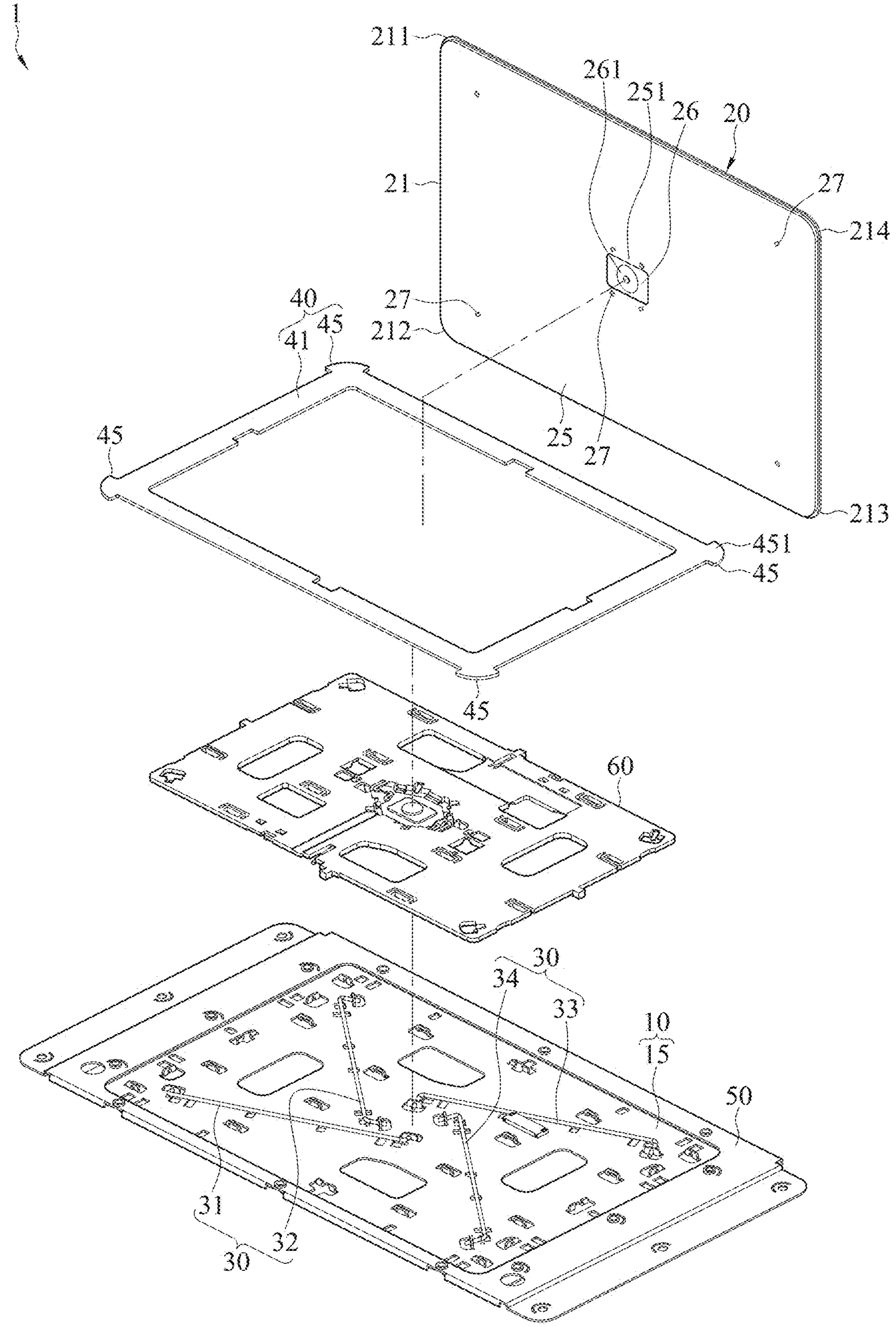
FIG. 2 illustrates an exploded view of a touchpad device according to a first embodiment of the instant disclosure.
Figure 3:
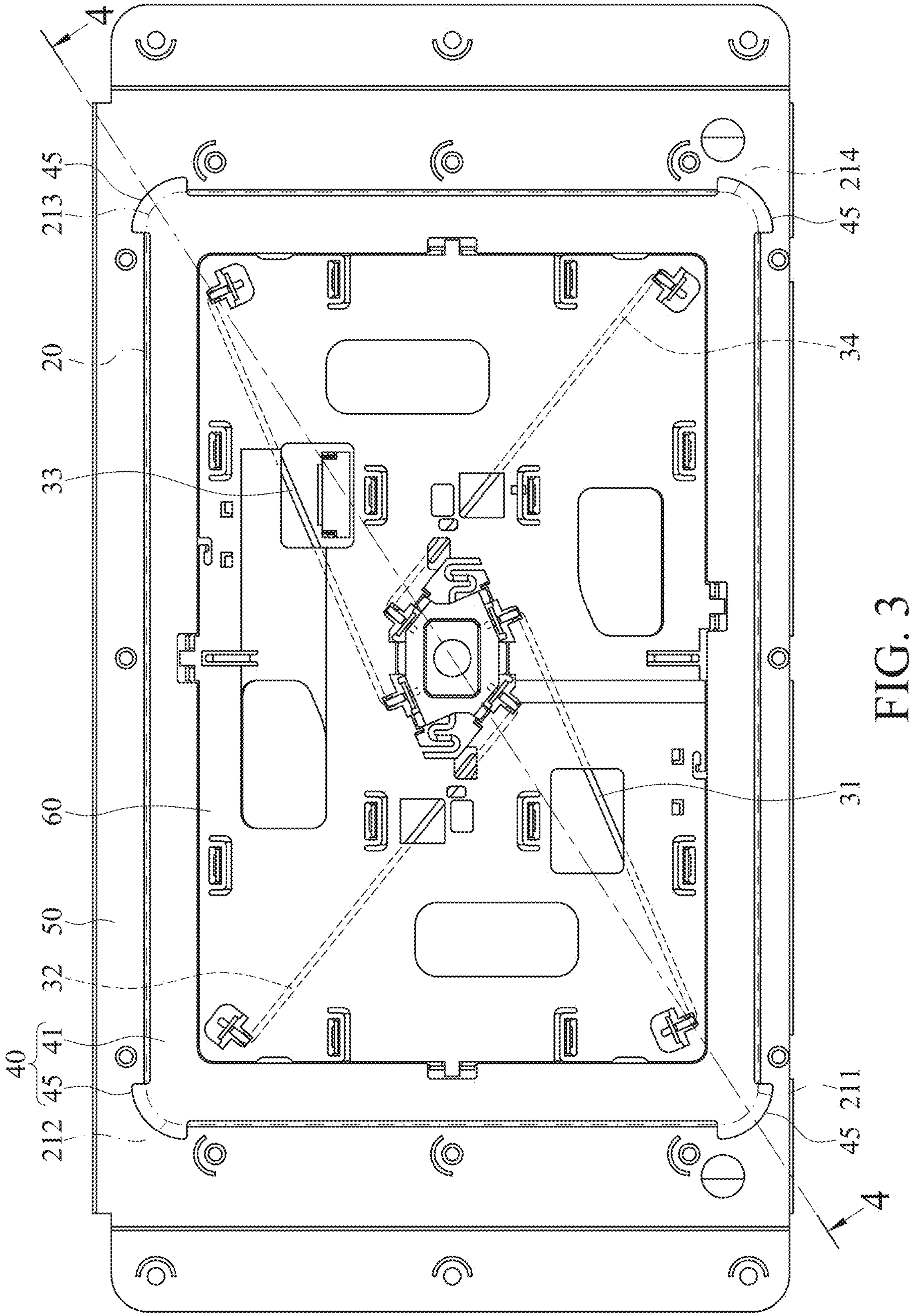
FIG. 3 illustrates a top view of the touchpad device according to the first embodiment of the instant disclosure.
Figure 4:
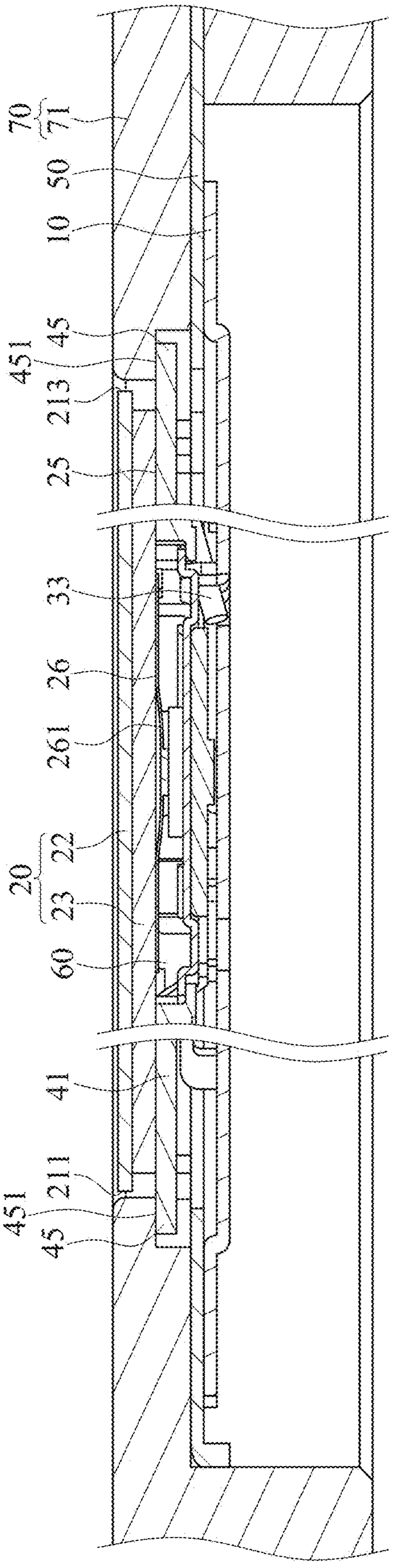
FIG. 4 illustrates a cross-sectional view along the line 4-4 shown in FIG. 3.
Figure 5:
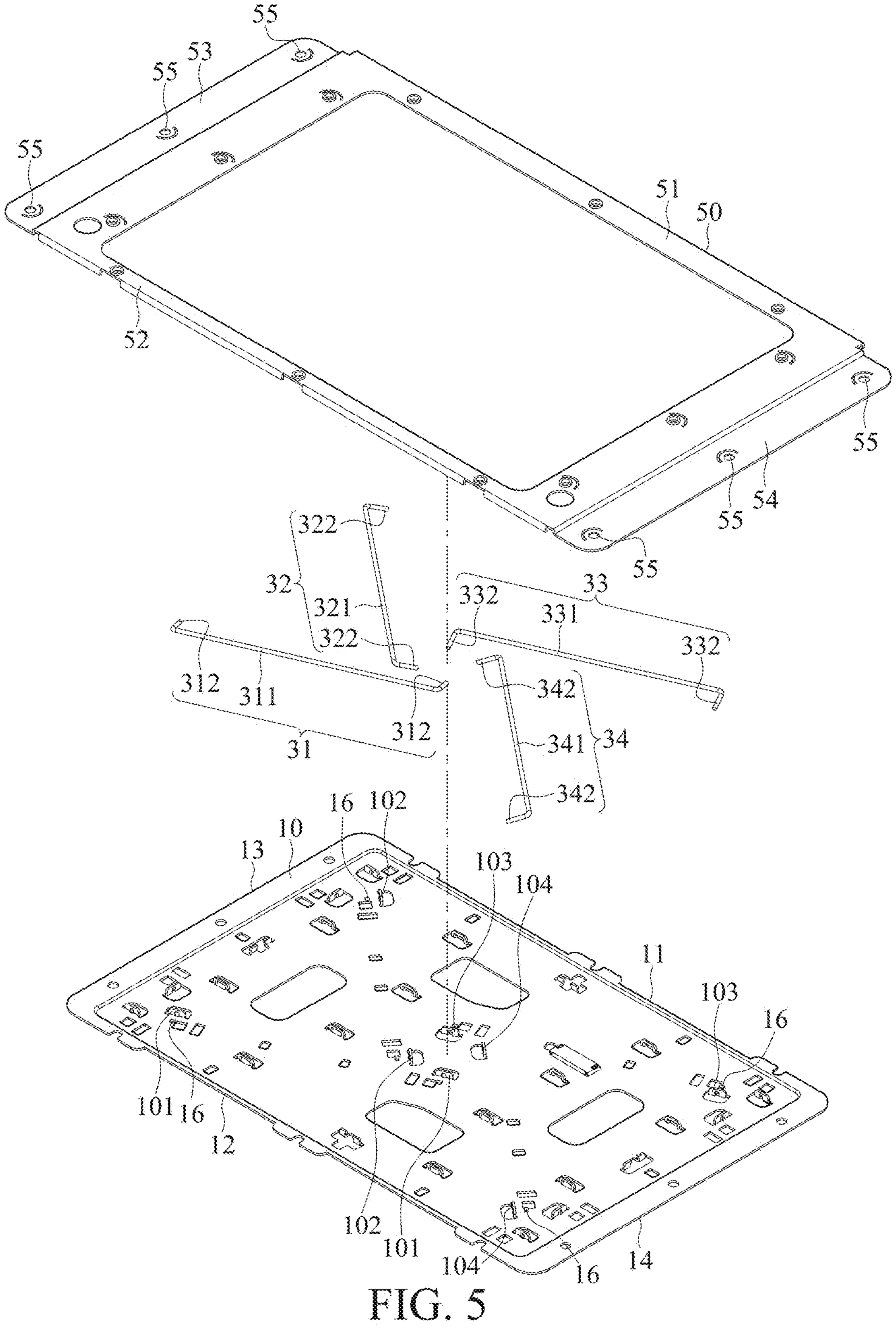
FIG. 5 illustrates an exploded partial view of the touchpad device according to the first embodiment of the instant disclosure.

FIG. 1 illustrates a schematic application view of a touchpad device according to an exemplary embodiment of the instant disclosure. FIG. 2 illustrates an exploded view of a touchpad device according to a first embodiment of the instant disclosure. FIG. 3 illustrates a top view of the touchpad device according to the first embodiment of the instant disclosure. FIG. 4 illustrates a cross-sectional view along the line 4-4 shown in FIG. 3. FIG. 5 illustrates an exploded partial view of the touchpad device according to the first embodiment of the instant disclosure. As shown in FIG. 1 and FIG. 2, the touchpad device 1 may be applied in a computer product, and the user can operate the touchpad device 1 by sliding the user's finger(s) on the touchpad device 1 or pressing the touchpad device 1 with the user's finger(s) so as to control the movement of the cursor or to generate corresponding control signal(s). For example, as shown in FIG. 1, in this embodiment, the touchpad device 1 is applied in a notebook computer N, but the instant disclosure is not limited thereto. In some other embodiments, the touchpad device 1 may be applied in other portable computers (e.g., tablet computers). Alternatively, in some embodiments, the touchpad device 1 may be an individual device and may be capable of externally connected to a computer, but the instant disclosure is not limited thereto.

As shown in FIG. 2 to FIG. 4, the touchpad device 1 comprises a substrate 10, a touch panel 20, a balancing assembly 30, and a reinforcement component 40. The substrate 10 may be a rigid plate made of metal (e.g., iron, aluminum, alloy, or the like) or plastic material. The substrate 10 has a top surface 15, and the touch panel 20, the balancing assembly 30, and the reinforcement component 40 are all disposed above the top surface 15 of the substrate 10.

As shown in FIG. 2 to FIG. 4, the touch panel 20 has an outer periphery 21 and an inner surface 25, and the inner surface 25 faces the top surface 15 of the substrate 10. In this embodiment, the touch panel 20 is of a rectangular shape, and the outer periphery 21 of the touch panel 20 has four corners (a first corner 211, a second corner 212, a third corner 213, and a fourth corner 214). The first corner 211 and the third corner 213 are opposite corners, and the second corner 212 and the fourth corner 214 are opposite corners. In some other embodiments, the touch panel 20 may be of other shapes, such as a square shape, but the instant disclosure is not limited thereto.

As shown in FIG. 4, in this embodiment, the touch panel 20 comprises a touch board 22 and a circuit board 23 which are stacked and fixed with each other, and the circuit board 23 is nearer to the substrate 10 as compared with the touch board 22 (in other words, in this embodiment, a distance between the circuit board 23 and the substrate 10 is less than a distance between the touch board 22 and the substrate 10). The touch board 22 is provided for being touched or pressed by the user. The circuit board 23 may perform functions such as scrolling, zooming in, zooming out, opening window, or the like in response to the movement or the gesture of the user's finger(s) on the touch board 22. Alternatively, in some embodiments, the circuit board 23 may perform functions such as selecting, displaying menu, or the like in response to the single-click or double-click of the user's finger(s) on the touch board 22.

In some embodiments, the touch board 22 may be a plate made of glass or polyester resin (mylar), and the circuit board 23 may be a membrane circuit board, a printed circuit board (PCB), a flexible printed circuit board (FPCB), a Rigid-Flex PCB, or other circuit boards. Moreover, the touch board 22 and the circuit board 23 may be assembled as a single board; for example, neighboring surfaces of the touch board 22 and the circuit board 23 may be combined with each other by adhesives, chemical glues (e.g., light curable glues), physical glues (e.g., thermosetting glues or thermoplastic glues), or the like, such that the touch board 22 and the circuit board 23 are integrated as a single board.

As shown in FIG. 2 to FIG. 4, the inner surface 25 of the touch panel 20 has a central region 251, and a switch 26 is on the central region 251. In this embodiment, the switch 26 has an elastic resilient member 261; for example, the elastic resilient member 261 may be a rubber dome, a metal dome, a spring, a metal elastic piece, or the like, so that the elastic resilient member 261 is capable of storing elastic forces when being pressed. The elastic resilient member 261 of the switch 26 may contact a central portion of the top surface 15 of the substrate 10 directly or indirectly, so that the touch panel 20 is maintained at a height position. When the touch panel 20 is pressed to be moved downward and toward the substrate 10, the touch panel 20 correspondingly abuts against the elastic resilient member 261, so that the elastic resilient member 261 stores the elastic force and triggers the circuit of the switch 26 to generate signal(s). When the touch panel 20 is released, the touch panel 20 is moved back to the height position using the elastic force stored in the elastic resilient member 261.

As shown in FIG. 2 to FIG. 4, where in FIG. 3, the touch panel 20 is illustrated in a perspective manner, so that the arrangement of the balancing assembly 30 shielded by the touch panel 20 can be seen from the figures. In this embodiment, the balancing assembly 30 is disposed between the touch panel 20 and the substrate 10. The balancing assembly 30 comprises a first balancing bar 31, a second balancing bar 32, a third balancing bar 33, and a fourth balancing bar 34.

Two ends of the first balancing bar 31 are respectively adjacent to the switch 26 and the first corner 211. Two ends of the second balancing bar 32 are respectively adjacent to the switch 26 and the second corner 212. Two ends of the third balancing bar 33 are respectively adjacent to the switch 26 and the third corner 213. Two ends of the fourth balancing bar 33 are respectively adjacent to the switch 26 and the fourth corner 214. In other words, in this embodiment, the first balancing bar 31, the second balancing bar 32, the third balancing bar 33, and the fourth balancing bar 34 are not parallel to the side of the touch panel 20; instead, in this embodiment, the first balancing bar 31, the second balancing bar 32, the third balancing bar 33, and the fourth balancing bar 34 surround the switch 26 and are arranged radially.

As shown in FIG. 2 and FIG. 5, in this embodiment, the first balancing bar 31 has a first shaft 311 and two first side bars 312, and the two first side bars 312 are respectively connected to two opposite ends of the first shaft 311. The second balancing bar 32 has a second shaft 321 and two second side bars 322, and the two second side bars 322 are respectively connected to two opposite ends of the second shaft 321. The third balancing bar 33 has a third shaft 331 and two third side bars 332, and the two third side bars 332 are respectively connected to two opposite ends of the third shaft 331. The fourth balancing bar 34 has a fourth shaft 341 and two fourth side bars 342, and the two fourth side bars 342 are respectively connected to two opposite ends of the fourth shaft 341.

In some embodiments, the first shaft 311 of the first balancing bar 31 is parallel to the third shaft 331 of the third balancing bar 33, and the second shaft 321 of the second balancing bar 32 is parallel to the fourth shaft 341 of the fourth balancing bar 34.

As shown in FIG. 2 and FIG. 5, the first shaft 311 of the first balancing bar 31, the second shaft 321 of the second balancing bar 32, the third shaft 331 of the third balancing bar 33, and the fourth shaft 341 of the fourth balancing bar 34 are rotatably connected to a bottom portion of the touch panel 20, respectively. Therefore, when the touch panel 20 is pressed to be moved downward, the first shaft 311, the second shaft 321, the third shaft 331, and the fourth shaft 341 are rotatable with respect to the touch panel 20. In this embodiment, an assembling plate 60 is disposed and stacked on the inner surface 25 of the touch panel 20; for example, the assembling plate 60 may be fixed on the inner surface 25 of the touch panel 20 through adhering, locking, engaging, or the like, and the first shaft 311, the second shaft 321, the third shaft 331, and the fourth shaft 341 are rotatably connected to the assembling plate 60, respectively.

As shown in FIG. 2 and FIG. 5, the substrate 10 is provided with two first assembling members 101 spaced apart from each other. Each of the first assembling members 101 is a hook structure integrally and upward extending from the substrate 10 (in this embodiment, the first assembling members 101 are L-shaped, but may be U-shaped, T-shaped, or of other shapes). In this embodiment, one of the two first assembling members 101 is adjacent to the first corner 211 of the touch panel 20, and the other one of the two first assembling members 101 is adjacent to the switch 26. The two side bars 312 of the first balancing bar 31 are movably connected to the two first assembling members 101, respectively. Therefore, when the touch panel 20 is pressed to be moved downward, each of the first side bars 312 is swingable with respect to a corresponding one of the first assembling members 101.

Further, as shown in FIG. 2 and FIG. 5, the substrate 10 is provided with two second assembling members 102 spaced apart from each other, two third assembling members 103 spaced apart from each other, and two fourth assembling members 104 spaced apart from each other. The two second side bars 322 of the second balancing bar 32 are movably assembled to the two second assembling members 102, respectively. The two third side bars 332 of the third balancing bar 33 are movably assembled to the two third assembling members 103, respectively. The two fourth side bars 342 of the fourth balancing bar 34 are movably assembled to the two fourth assembling members 104, respectively. The arrangement between each of the second side bars 322 and a corresponding one of the second assembling members 102, the arrangement between each of the third side bars 332 and a corresponding one of the third assembling members 103, and the arrangement between each of the fourth side bars 342 and a corresponding one of the fourth assembling members 104 may be the same or similar with the arrangement of each of the first side bars 312 and the corresponding one of the assembling members 101, and repeated descriptions are thus omitted herein.

Accordingly, through the arrangement of the balancing assembly 30 in one or some embodiments of the instant disclosure, when any portion of the touch panel 20 (for example, the corner or the edge of the touch panel 20) is pressed, the pressing force can be directly and quickly transmitted to the switch 26 through the balancing assembly 30, so that the elastic resilient member 261 of the switch 26 is pressed and moved downward to provide the pressing operation feeling. Moreover, the issues of excessive wobbling, bending, or empty stroke of the touch panel 20 generated upon the corner or the edge of the touch panel 20 is pressed can be prevented. For example, as shown in FIG. 2 and FIG. 3, when the first corner 211 of the touch panel 20 is pressed, because the two ends of the first balancing bar 31 are respectively adjacent to the first corner 211 and the switch 26, the pressing force can be directly transmitted to the switch 26 along an extension direction of the first balancing bar 31 to drive the elastic resilient member 261 of the switch 26 to be moved downward. Likewise, when the second corner 212 or the third corner 213 or the fourth corner 214 of the touch panel 20 is pressed, the pressing force can be directly transmitted to the switch 26 through the second balancing bar 32 or the third balancing bar 33 or the fourth balancing bar 34. Accordingly, the transmission performance of the pressing force can be enhanced.

As shown in FIG. 2 to FIG. 4, the reinforcement component 40 comprises a main plate 41 and a plurality of limiting convex plates 45, and the main plate 41 is disposed on the inner surface 25 of the touch panel 20; for example, the main plate 41 may be fixed on the inner surface 25 of the touch panel 20 through adhering, locking, engaging, or the like. In this embodiment, the main plate 41 is an annular plate having a rectangular shape, the main plate 41 is fixed on a periphery of the inner surface 25 of the touch panel 20 and is adjacent to the outer periphery 21 of the touch panel 20, and the main plate 41 surrounds the assembling plate 60. Therefore, the structural strength for the peripheral portion of the touch panel 20 can be increased without additionally providing other balancing bars on the side portions of the touch panel 20, and thus the cost for the touchpad device 1 can be reduced. However, it is understood that, the embodiments are provided merely for illustrative purposes, and the instant disclosure is not limited thereto. In some embodiments, the reinforcement component 40 and the assembling plate 60 may be integrally formed as a single plate.

As shown in FIG. 2 to FIG. 4, the limiting convex plates 45 may be integrally connected to or assembled on the periphery of the main plate 41. In this embodiment, the number of the limiting convex plates 45 may be four, and the four limiting convex plates 45 are integrally connected to the periphery of the main plate 41. The four limiting convex plates 45 protrude from the outer periphery 21 of the touch panel 20 and are respectively adjacent to the first corner 211, the second corner 212, the third corner 213, and the fourth corner 214 of the touch panel 20. Each of the limiting convex plates 45 is adapted to abut on a fixation member except the touch panel 20, so that the height of the touch panel 20 can be limited and the touch panel 20 can be prevented from detaching off the substrate 10. It is understood that, the number and the position of the limiting convex plates 45 may be adjusted according to actual demands, and the instant disclosure is not limited thereto.

For example, as shown in FIG. 1, the touchpad device 1 may be assembled within a housing 70 of the notebook computer N. The housing 70 has a cover plate 71, the cover plate 71 has a hollow portion 711, and the position of the touch panel 20 of the touchpad device 1 corresponds to the position of the hollow portion 711, so that the user can operate the touch panel 20 from the portion of the touch panel 20 exposed from the hollow portion 711. Each of the limiting convex plates 45 of the reinforcement component 40 has a stopping surface 451 opposite to the substrate 10. As shown in FIG. 4, when the touch panel 20 is at the height position, the stopping surface 451 of each of the limiting convex plates 45 can abut against the cover plate 71 to provide the limiting function for the touch panel 20; when the touch panel 20 is pressed to be moved downward and toward the substrate 10, the limiting convex plates 45 can be moved downward at the same time so that the stopping surfaces 451 of the limiting convex plates 45 are detached from the cover plate 71.

Accordingly, according to one or some embodiments of the instant disclosure, the main plate 41 of the reinforcement component 40 is disposed on the inner surface 25 of the touch panel 20. Therefore, the structural strength of the touch panel 20 can be further increased. Hence, the issues of excessive wobbling, bending, or empty stroke of the touch panel 20 generated upon the corner or the edge of the touch panel 20 is pressed can be prevented. Furthermore, according to one or some embodiments of the instant disclosure, the limiting convex plates 45 of the reinforcement component 40 protrude from the outer periphery 21 of the touch panel 20 and are respectively adjacent to the first corner 211, the second corner 212, the third corner 213, and the fourth corner 214. Therefore, when the corner of the touch panel 20 is pressed, the touch panel 20 can be accelerated to be moved downward and toward the substrate 10, so that the switch 26 can be triggered more quickly to provide the user with a much better operation feeling.

For example, as shown in FIG. 3 and FIG. 4, when the user presses the first corner 211 of the touch panel 20, at the moment of the pressing operation, the touch panel 20 inclines toward the first corner 211, and the limiting convex plate 45 adjacent to the third corner 213 upward abuts against the corresponding leaning member (such as the cover plate 71) to generate a reaction force, and the reaction force thus is downward applied to the touch panel 20, so that the touch panel 20 can be accelerated to be moved downward and toward the substrate 10 to trigger the switch 26. Likewise, when the second corner 212, the third corner 213, or the fourth corner 214 of the touch panel 20 is pressed, identical effect can be generated as well and repeated descriptions are thus omitted herein.

As shown in FIG. 2 and FIG. 5, the substrate 10 has a first side 11, a second side 12, a third side 13, and a fourth side 14, in which the first side 11 and the second side 12 are opposite sides, and the third side 13 and the fourth side 14 are opposite sides. In this embodiment, the substrate 10 is a rectangular plate, the first side 11 and the second side 12 are long sides of the substrate 10, and the third side 13 and the fourth side 14 are short sides of the substrate 10. Therefore, a length of the first side 11 is equal to a length of the second side 12, the length of the first side 11 is greater than a length of the third side 13 and greater than a length of the fourth side 14, and the length of the third side 13 is equal to the length of the fourth side 14.

As shown in FIG. 2, FIG. 4, and FIG. 5, the touchpad device 1 further comprises a reinforcement member 50, and the reinforcement member 50 may at least comprise a first reinforcement plate 51 and a second reinforcement plate 52, the first reinforcement plate 51 and the second reinforcement plate 52 are respectively assembled and fixed on the first side 11 and the second side 12 of the substrate 10; for example, the first reinforcement plate 51 and the second reinforcement plate 52 are fixed on the substrate 10 through adhering, locking, engaging, or the like. In other words, because the length of the long side of the substrate 10 is greater than the length of the short side of the substrate 10, when the substrate 10 is applied with a force, the deformation of the substrate 10 occurs more easily along the long side direction. Therefore, in some embodiments, the first reinforcement plate 51 and the second reinforcement plate 52 are respectively fixed on the long sides of the substrate 10 (the first side 11 and the second side 12), so that the structural strength of the substrate 10 can be increased, and the deformation of the substrate 10 due to being applied with a force can be prevented to affect the operation feeling of the touch panel 20.

As shown in FIG. 2, FIG. 4, and FIG. 5, the reinforcement member 50 may further comprise a third reinforcement plate 53 and a fourth reinforcement plate 54, and the third reinforcement plate 53 and the fourth reinforcement plate 54 are respectively assembled and fixed on the third side 13 and the fourth side 14 of the substrate 10; that is, in this embodiment, the third reinforcement plate 53 and the fourth reinforcement plate 54 are respectively fixed on the short sides of the substrate 10, so that all the four sides of the substrate 10 can be reinforced, thereby further increasing the anti-deformation ability of the substrate 10. In this embodiment, the first reinforcement plate 51, the second reinforcement plate 52, the third reinforcement plate 53, and the fourth reinforcement plate 54 of the reinforcement member 50 are further connected to each other to form an annular plate, so that the reinforcement member 50 can provide a better reinforcement performance for the substrate 10.

Figure 12:
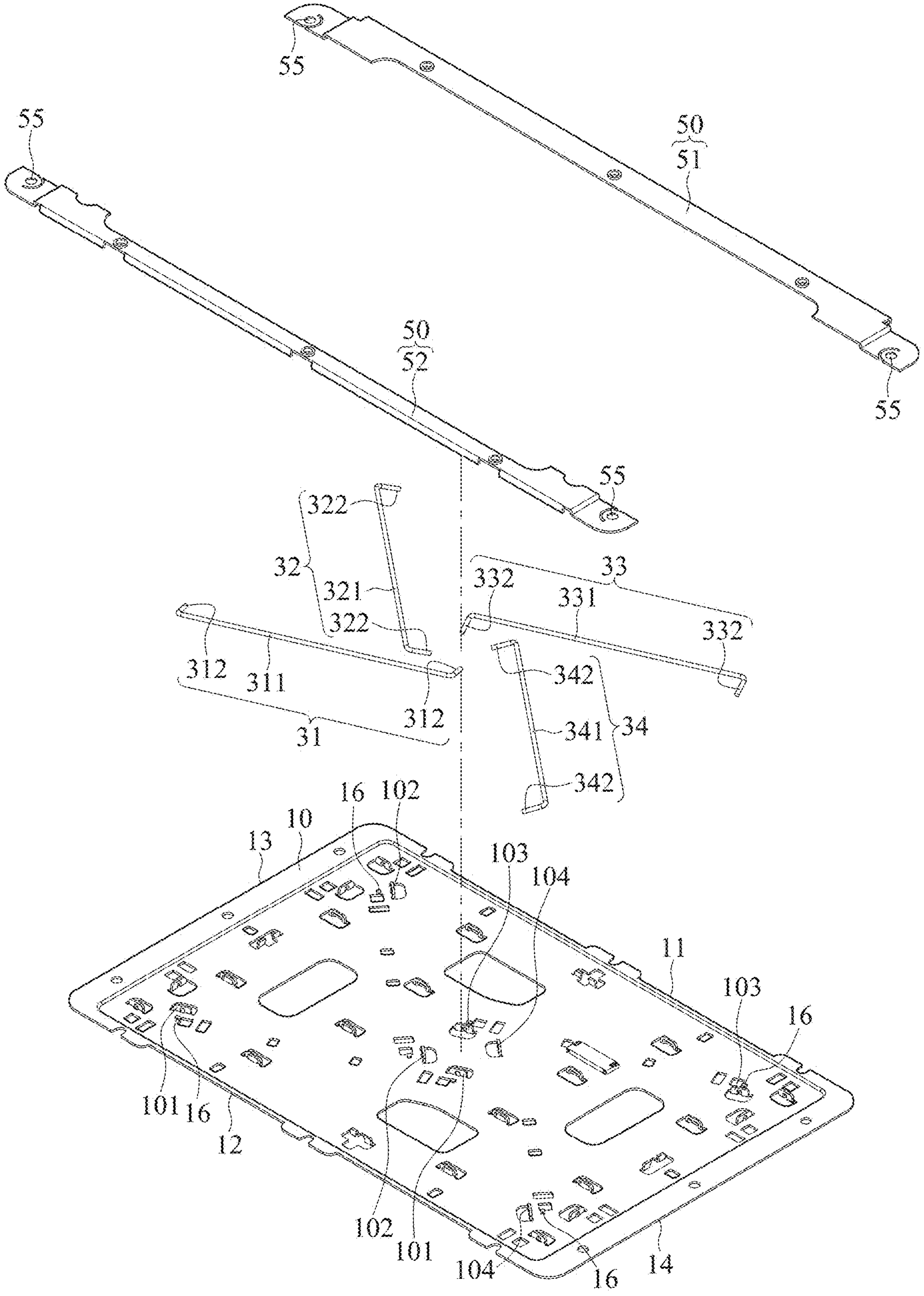
FIG. 12 illustrates an exploded view of a touchpad device according to a fifth embodiment of the instant disclosure.

However, it is understood that, the embodiments are provided merely for illustrative purposes. In some embodiments, the reinforcement member 50 may merely have the first reinforcement plate 51 and the second reinforcement plate 52 or merely have the third reinforcement plate 53 and the fourth reinforcement plate 54. For example, as shown in FIG. 12, which illustrates a touchpad device according to a fifth embodiment of the instant disclosure, the difference between this embodiment and the embodiment shown in FIG. 5 is at least that, in this embodiment, the reinforcement member 50 merely has the first reinforcement plate 51 and the second reinforcement plate 52 to provide reinforcement function for the substrate 10.

As shown in FIG. 2, FIG. 4, and FIG. 5, in this embodiment, the reinforcement member 50 further comprises at least one cover plate assembling portion 55. The cover plate assembling portion 55 is adapted to be assembled on the cover plate 71 of the housing 70 of the notebook computer N, so that the substrate 10 is indirectly connected to and fixed on the cover plate 71 of the notebook computer N through the reinforcement member 50. Therefore, when the cover plate 71 is deformed, the deformation of the cover plate 71 does not cause the substrate 10 to be deformed easily, so that the operation feeling of the touch panel 20 can be prevented from being affected. Accordingly, after the touchpad device 1 is assembled on the cover plate 71 of the notebook computer N, the product can be ensured to provide an expected operation performance.

As shown in FIG. 4 and FIG. 5, the cover plate assembling portion 55 may be disposed on at least one of the first reinforcement plate 51, the second reinforcement plate 52, the third reinforcement plate 53, and the fourth reinforcement plate 54. For example, in this embodiment, the cover plate assembling portion 55 is a hole and the number of the cover plate assembling portions 55 is plural. The cover plate assembling portions 55 are respectively disposed on the third reinforcement plate 53 and the fourth reinforcement plate 54, the cover plate assembling portions 55 of the third reinforcement plate 53 are on the same surface of the third reinforcement plate 53, and the cover plate assembling portions 55 of the fourth reinforcement plate 54 are on the same surface of the fourth reinforcement plate 54. Therefore, when the third reinforcement plate 53 and the fourth reinforcement plate 54 are assembled on the cover plate 71, the assembling errors between the third reinforcement plate 53 and the cover plate 71 and between the fourth reinforcement plate 54 and the cover plate 71 do not occur easily.

In some embodiments, the plates of the reinforcement member 50 (the first reinforcement plate 51, the second reinforcement plate 52, the third reinforcement plate 53, and the fourth reinforcement plate 54) may be metal plates to have a proper anti-deformation ability. Therefore, when the cover plate 71 is deformed, the deformation of the reinforcement member 50 does not occur easily to prevent the subsequent deformation of the substrate 10 to affect the operation feeling of the touch panel 20.

Figure 6:
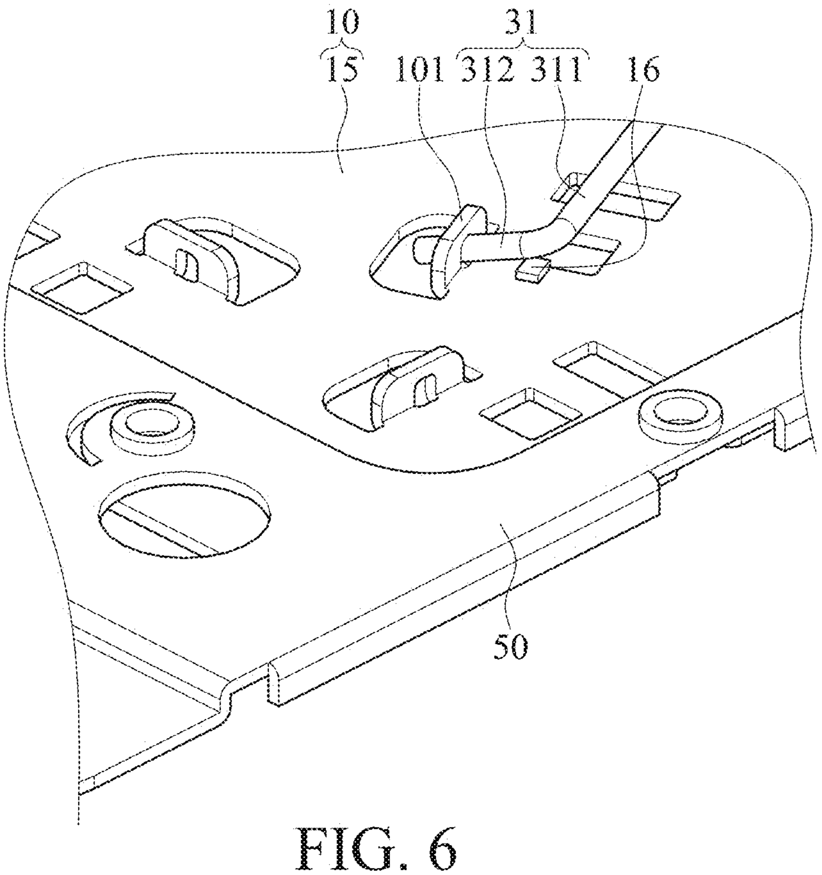
FIG. 6 illustrates an enlarged partial perspective view of the touchpad device according to the first embodiment of the instant disclosure.
Figure 7:
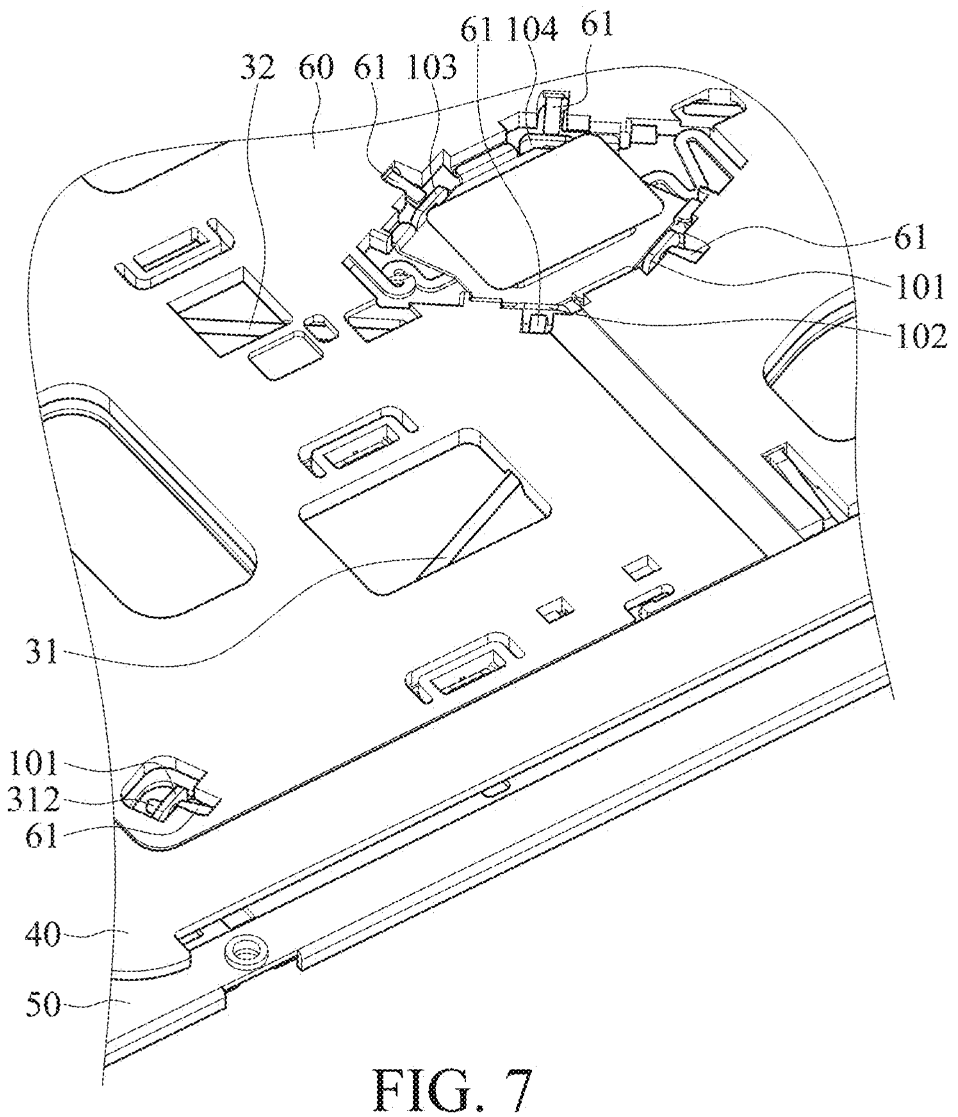
FIG. 7 illustrates another enlarged partial perspective view of the touchpad device according to the first embodiment of the instant disclosure.
Figure 8:
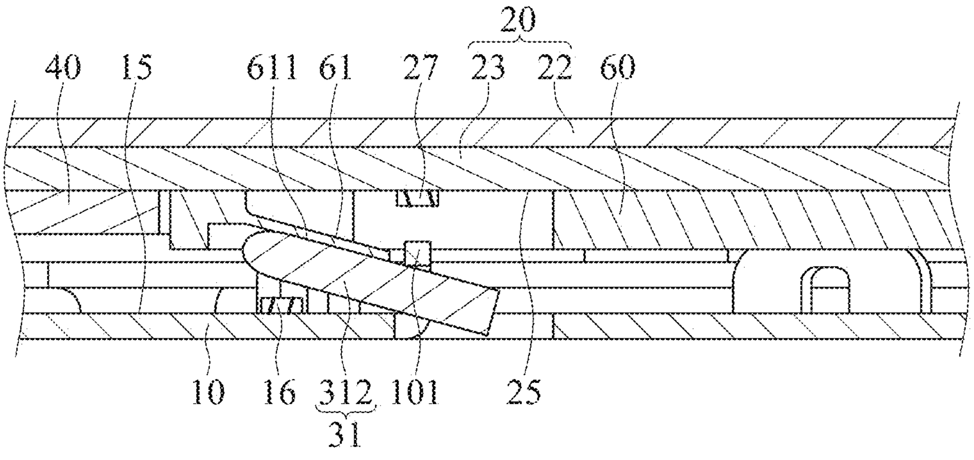
FIG. 8 illustrate a partial cross-sectional view of the touchpad device according to the first embodiment of the instant disclosure.

FIG. 6 illustrates an enlarged partial perspective view of the touchpad device according to the first embodiment of the instant disclosure. FIG. 7 illustrates another enlarged partial perspective view of the touchpad device according to the first embodiment of the instant disclosure. FIG. 8 illustrates a partial cross-sectional view of the touchpad device according to the first embodiment of the instant disclosure. As shown in FIG. 5, FIG. 6, and FIG. 8, a cushioning member 16 may be disposed between at least one of the balancing bars of the balancing assembly 30 (the first balancing bar 31, the second balancing bar 32, the third balancing bar 33, and the fourth balancing bar 34) and the top surface 15 of the substrate 10. For example, the cushioning member 16 may be foam (such as sponge or Styrofoam), clay, rubber, silicone, solid glue, or the like. The cushioning member 16 prevents the balancing bars of the balancing assembly 30 from impacting the substrate 10 directly, generating noises, and affecting the operation feeling of the touch panel 20 during the movement of the balancing assembly 30. In this embodiment, the number of the cushioning member 16 is plural and the cushioning members 16 are fixed on the top surface 15 of the substrate 10. The positions of the cushioning members 16 respectively correspond to the position of the first side bars 312 of the first balancing bar 31, the position of the second side bars 322 of the second balancing bar 32, the position of the third side bars 332 of the third balancing bar 33, and the position of the fourth side bars 342 of the fourth balancing bar 34, but the instant disclosure is not limited thereto. In some other embodiments, the cushioning members 16 may be fixed on the side bars of the balancing bars of the balancing assembly 30.

As shown in FIG. 2, FIG. 7, and FIG. 8, a cushioning body 27 may be disposed between at least one of the assembling members of the substrate 10 (the first assembling members 101, the second assembling members 102, the third assembling members 103, and the fourth assembling members 104) (which are provided for being assembled with the balancing assembly 30) and the inner surface 25 of the touch panel 20. For example, the cushioning body 27 may be foam (such as sponge or Styrofoam), clay, rubber, silicone, solid glue, or the like. The cushioning body 27 prevents the touch panel 20 from directly impacting the assembling members of the substrate 10, generating noises, and affecting the operation feeling of the touch panel 20 during the downward movement of the touch panel 20 toward the substrate 10. In this embodiment, the number of the cushioning body 27 is plural and the cushioning bodies 27 are fixed on the inner surface 25 of the touch panel 20. The cushioning bodies 27 are respectively disposed above the first assembling members 101, the second assembling members 102, the third assembling members 103, and the fourth assembling members 104, but the instant disclosure is not limited thereto. In some other embodiments, the cushioning bodies 27 may be fixed on the assembling members of the substrate 10.

As shown in FIG. 7 and FIG. 8, the assembling plate 60 may have a plurality of flexible arms 61 obliquely extending toward the substrate 10 from the assembling plate 60. When the touch panel 20 is not pressed yet and thus the touch panel 20 is at the height position, the flexible arms 61 respectively contact the first side bars 312 of the first balancing bar 31, the second side bars 322 of the second balancing bar 32, the third side bars 332 of the third balancing bar 33, and the fourth side bars 342 of the fourth balancing bar 34 (as shown in FIG. 8). Therefore, during the operation of the touchpad device 1, the first balancing bar 31, the second balancing bar 32, the third balancing bar 33, and the fourth balancing bar 34 can be operated stably and do not generate noises easily. Alternatively, in some embodiments, after the touch panel 20 is pressed to be moved toward substrate 10, the flexible arms 61 then starts contacting the first side bars 312, the second side bars 322, the third side bars 332, and the fourth side bars 342. Therefore, likewise, during the operation of the touchpad device 1, the first balancing bar 31, the second balancing bar 32, the third balancing bar 33, and the fourth balancing bar 34 can be operated stably and do not generate noises easily. As shown in FIG. 8, take the first balancing bar 31 as an example, in this embodiment, an inclination angle of the flexible arm 61 of the assembling plate 60 may be substantially identical to an inclination angle of the first side bar 312 of the first balancing bar 31, the flexible arm 61 has a bottom surface 611 facing the first side bar 312, and the bottom surface 611 of the flexible arm 61 may contact the first side bar 312 of the first balancing bar 31 in a surface-contact manner, so that the flexible arm 61 can provide a better supporting function for the first side bar 312 of the first balancing bar 31. Therefore, during the operation of the touchpad device 1, the first side bar 312 of the first balancing bar 31 can be operated stably and thus shaking or wobbling of the first side bar 312 do not occur easily, so that the first side bar 312 can be prevented from impacting or wearing against other components to generate noises. However, it is understood that, the embodiments are provided merely for illustrative purposes, and the instant disclosure is not limited thereto. In some other embodiments, each of the flexible arms 61 may contact a corresponding one of the side bars of the first balancing bar 31, the second balancing bar 32, the third balancing bar 33, and the fourth balancing bar 34 in a line-contact manner or a point-contact manner.

In some embodiments, when the touch panel 20 is not pressed yet, an included angle between each of the flexible arms 61 of the assembling plate 60 and the substrate 10 may be in a range between 15 degrees and 45 degrees, and an included angle between each of the side bars of the first balancing bar 31, the second balancing bar 32, the third balancing bar 33, and the fourth balancing bar 34 and the substrate 10 may be in a range between 15 degrees and 45 degrees.

Figure 9:
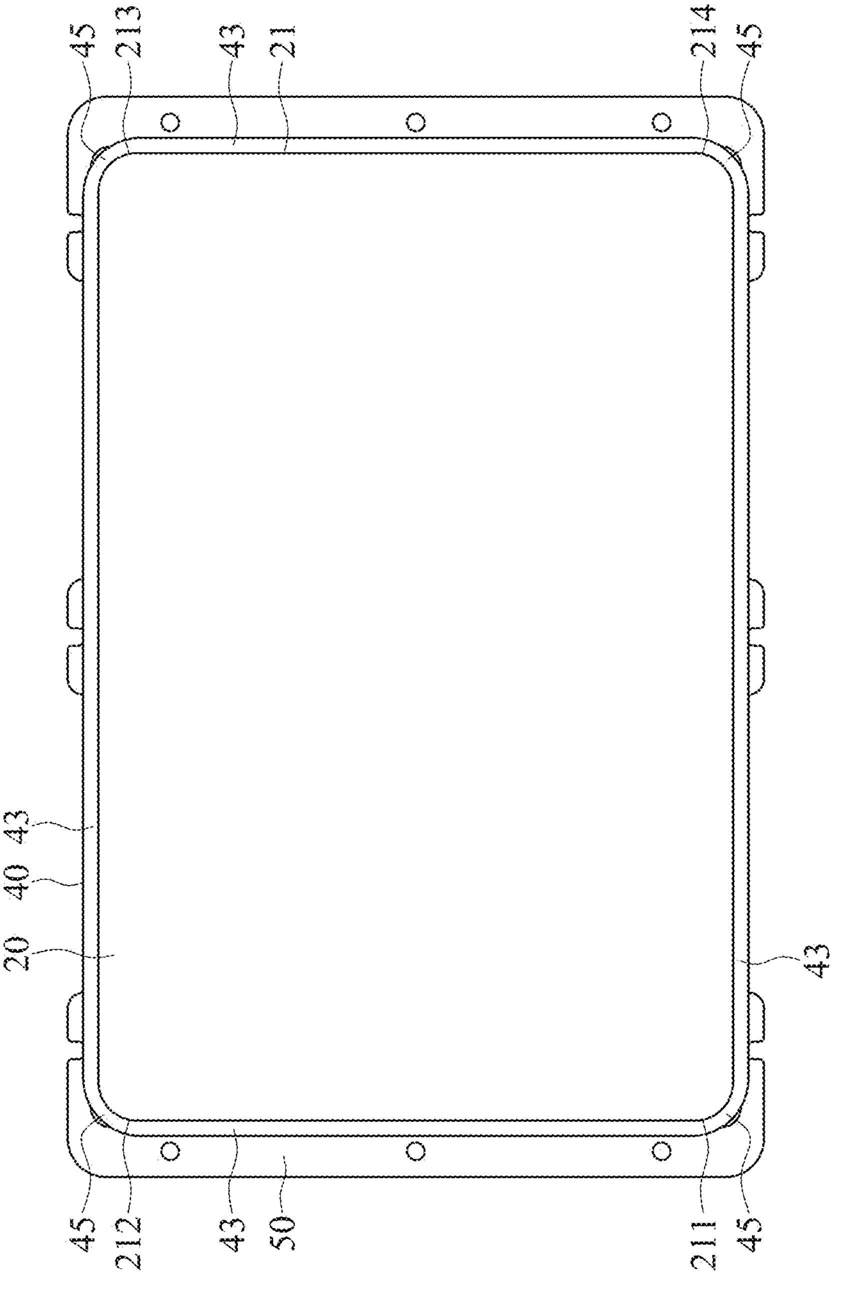
FIG. 9 illustrates a top view of a touchpad device according to a second embodiment of the instant disclosure.

FIG. 9 illustrates a top view of a touchpad device according to a second embodiment of the instant disclosure. As shown in FIG. 9, the difference between this embodiment and the first embodiment is at least that, in this embodiment, the reinforcement component 40 further comprises a plurality of limiting side plates 43, the limiting side plates 43 are connected to the periphery of the main plate 41 and protrude from the outer periphery 21 of the touch panel 20, and the limiting side plates 43 are respectively connected between the limiting convex plates 45. For example, in this embodiment, the limiting side plates 43 and the limiting convex plates 45 are integrally connected to each other to form an annular plate so as to increase the overall structural strength of the reinforcement component 40. The limiting side plates 43 are adapted to abut on a fixation member (for example, the cover plate 71) except the touch panel 20 to limit the height of the touch panel 20, and the contact area between the reinforcement component 40 and the fixation member can be increased. Therefore, the force can be prevented from overly concentrating on the limiting convex plates 45 so that the service life of the reinforcement component 40 can be prolonged.

Figure 10:
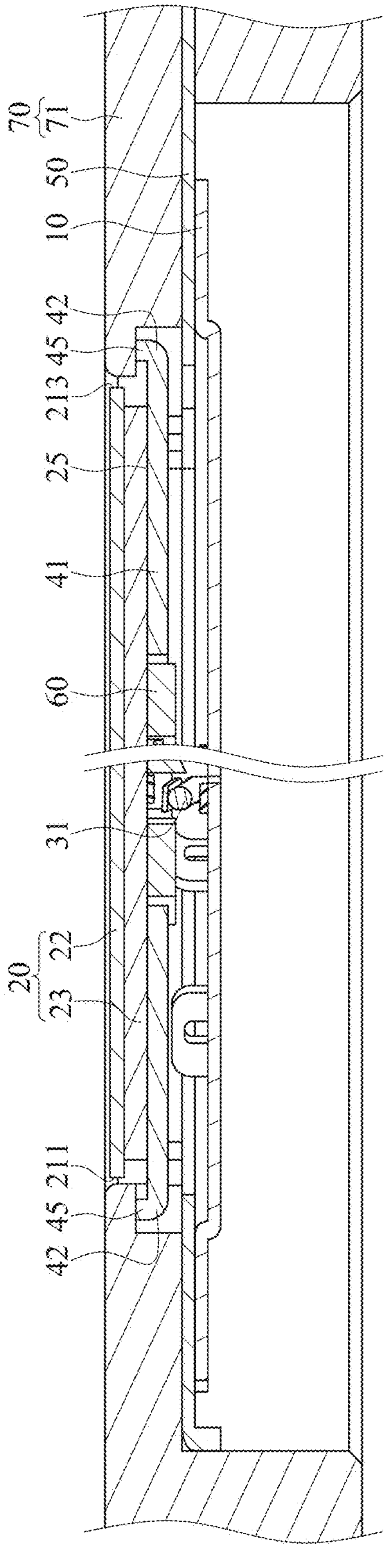
FIG. 10 illustrates a cross-sectional view of a touchpad device according to a third embodiment of the instant disclosure.
Figure 11:
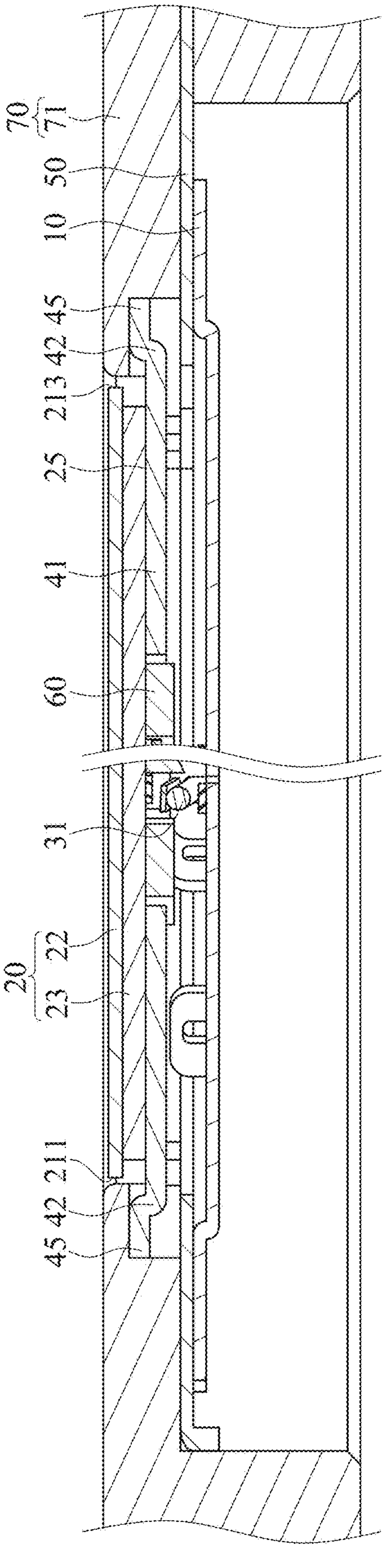
FIG. 11 illustrates a cross-sectional view of a touchpad device according to a fourth embodiment of the instant disclosure.

FIG. 10 illustrates a cross-sectional view of a touchpad device according to a third embodiment of the instant disclosure. FIG. 11 illustrates a cross-sectional view of a touchpad device according to a fourth embodiment of the instant disclosure. In some embodiments, the reinforcement component 40 may be provided with a bent structure to increase the overall structural strength of the reinforcement component 40. For example, as shown in FIG. 10, the reinforcement component 40 may comprise a plurality of bent plates 42, and each of the bent plates 42 is connected between a corresponding one of the limiting convex plates 45 and the main plate 41. In this embodiment, the limiting convex plates 45 are perpendicular to the main board 41, and each of the bent plates 42 is integrally connected between a corresponding one of the limiting convex plates 45 and the main plate 41. Alternatively, as shown in FIG. 11, in this embodiment, the limiting convex plates 45 are parallel to the main plate 41, and each of the bent plates 42 is integrally connected between the corresponding one of the limiting convex plates 45 and the main plate 41, so that the limiting convex plates 45 and the main plate 41 are at different heights.

Figure 13:
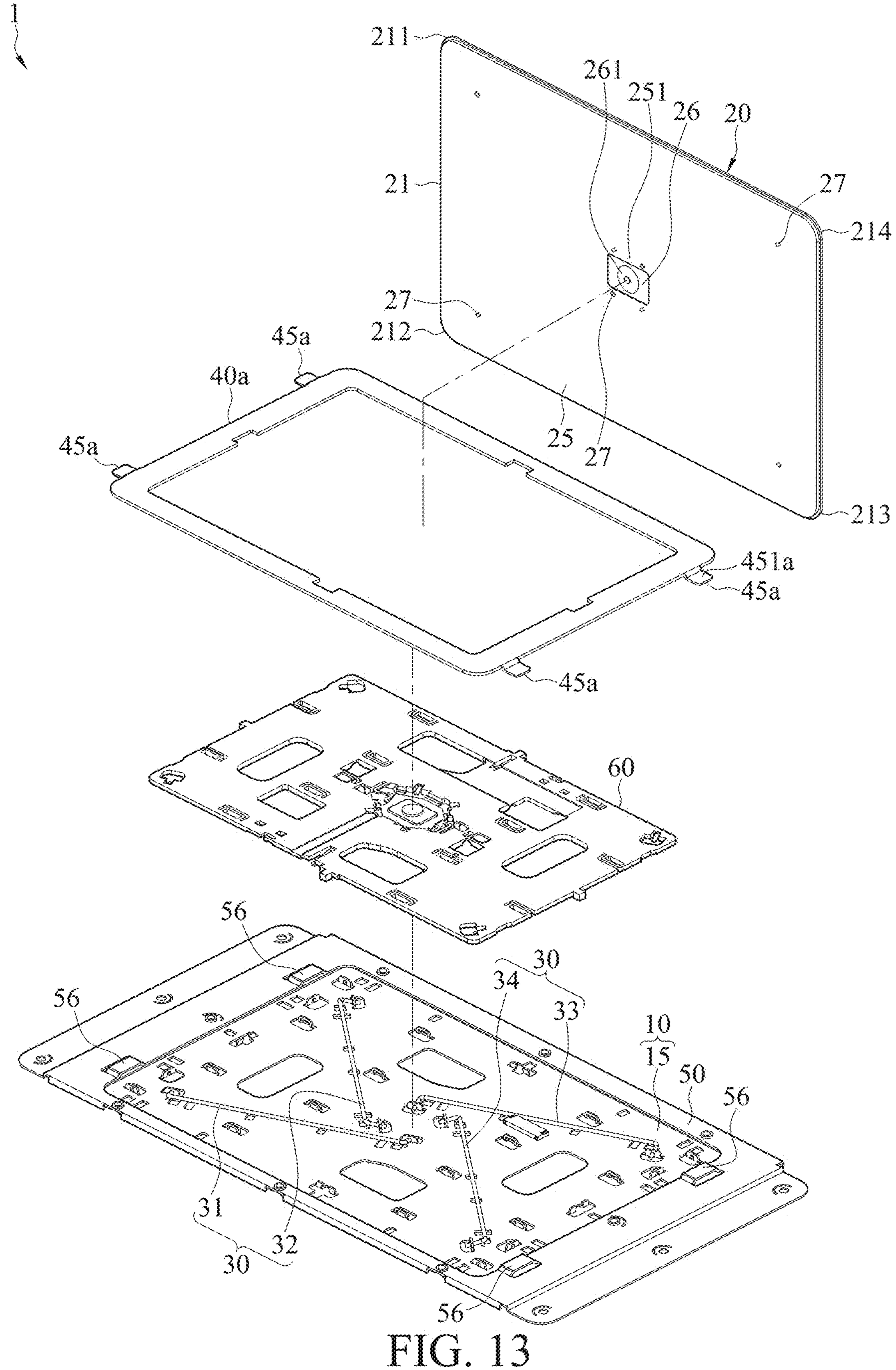
FIG. 13 illustrates an exploded view of a touchpad device according to a sixth embodiment of the instant disclosure.
Figure 14:
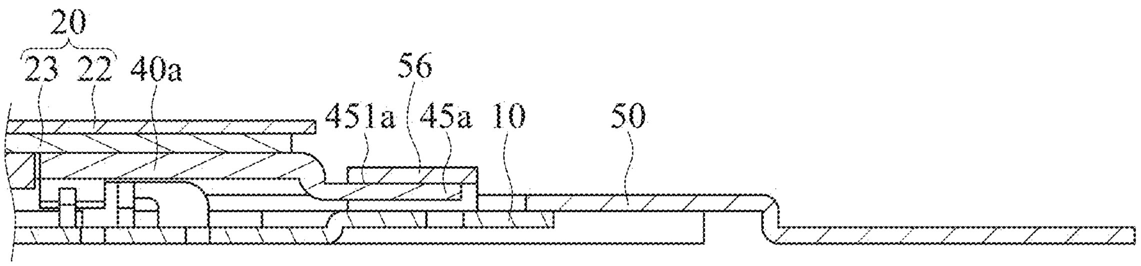
FIG. 14 illustrates a cross-sectional view of the touchpad device according to the sixth embodiment of the instant disclosure.

FIG. 13 illustrates an exploded view of a touchpad device according to a sixth embodiment of the instant disclosure. FIG. 14 illustrates a cross-sectional view of the touchpad device according to the sixth embodiment of the instant disclosure. As shown in FIG. 13 and FIG. 14, the difference between this embodiment and the first embodiment is at least that, in this embodiment, when the touch panel 20 is at the height position, the stopping surface 451*a* of each of the limiting convex plates 45*a* of the reinforcement component 40*a* directly leans against the reinforcement member 50, rather than the cover plate 71. Therefore, the reinforcement component 40*a* can provide the limiting function for the touch panel 20. For example, in this embodiment, the reinforcement member 50 has a plurality of limiting members 56, and the stopping surfaces 451*a* of the limiting convex plates 45*a* of the reinforcement component 40*a* respectively lean against the limiting members 56, so that the touch panel 20 can be limited. Each of the limiting members 56 may be a hook structure integrally and upward extending from the reinforcement member 50 (in this embodiment, the limiting members 56 are U-shaped, but may be L-shaped, T-shaped, or of other shapes), but the instant disclosure is not limited thereto.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A touchpad device comprising:

a substrate;

a touch panel disposed above the substrate, wherein the touch panel has an outer periphery and an inner surface, the inner surface faces the substrate, the outer periphery has a first corner, a second corner, a third corner, and a fourth corner, the inner surface has a central region, and a switch is on the central region;

a balancing assembly disposed between the touch panel and the substrate, wherein the balancing assembly comprises a first balancing bar, a second balancing bar, a third balancing bar, and a fourth balancing bar; two ends of the first balancing bar are respectively directly adjacent to the switch and the first corner, two ends of the second balancing bar are respectively directly adjacent to the switch and the second corner, two ends of the third balancing bar are respectively directly adjacent to the switch and the third corner, and two ends of the fourth balancing bar are respectively directly adjacent to the switch and the fourth corner; and a reinforcement component comprising a main plate and a plurality of limiting convex plates, wherein the main plate is disposed on the inner surface of the touch panel, and the limiting convex plates are connected to a periphery of the main plate and protrude from the outer periphery of the touch panel.

2. The touchpad device according to claim 1, wherein the limiting convex plates are respectively adjacent to the first corner, the second corner, the third corner, and the fourth corner.

3. The touchpad device according to claim 1, wherein each of the limiting convex plates has a stopping surface, and the stopping surface is opposite to the substrate and adapted to abut against a cover plate of a housing.

4. The touchpad device according to claim 1, wherein the reinforcement component comprises a plurality of bent plates, and each of the bent plates is connected between a corresponding one of the limiting convex plates and the main plate.

5. The touchpad device according to claim 1, wherein the reinforcement component comprises a plurality of limiting side plates, the limiting side plates are connected to the periphery of the main plate and protrude from the outer periphery of the touch panel, and the limiting side plates are respectively connected between the limiting convex plates.

6. The touchpad device according to claim 1, further comprising a reinforcement member, wherein the reinforcement member comprises a first reinforcement plate and a second reinforcement plate, the substrate has a first side and a second side opposite to the first side, and the first reinforcement plate and the second reinforcement plate are respectively assembled and fixed on the first side and the second side.

7. The touchpad device according to claim 6, wherein the substrate has a third side and a fourth side opposite to the third side, a length of the first side is equal to a length of the second side, and the length of the first side is greater than a length of the third side and greater than a length of the fourth side.

8. The touchpad device according to claim 6, wherein the reinforcement member further comprises a cover plate assembling portion, and the cover plate assembling portion is adapted to be assembled on a cover plate of a housing.

9. The touchpad device according to claim 6, wherein the reinforcement member comprises a third reinforcement plate and a fourth reinforcement plate, the substrate has a third side and a fourth side opposite to the third side, and the third reinforcement plate and the fourth reinforcement plate are respectively assembled and fixed on the third side and the fourth side.

10. The touchpad device according to claim 9, wherein the first reinforcement plate, the second reinforcement plate, the third reinforcement plate, and the fourth reinforcement plate are connected to each other to form an annular plate.

11. The touchpad device according to claim 6, wherein each of the limiting convex plates has a stopping surface, and the stopping surface is opposite to the substrate and adapted to lean against the reinforcement member.

12. The touchpad device according to claim 1, further comprising an assembling plate, wherein the assembling plate is disposed on the inner surface of the touch panel, the first balancing bar has a first shaft and two first side bars, the two first side bars are respectively connected to two opposite ends of the first shaft, the first shaft is rotatably connected to the assembling plate, the two first side bars are movably assembled on the substrate, and the assembling plate has two flexible arms; the touch panel is selectively pressed to be moved toward the substrate, and during a movement of the touch panel, the two flexible arms respectively contact the two first side bars.

13. The touchpad device according to claim 1, wherein the substrate has a top surface, and a cushioning member is between the first balancing bar and the top surface.

14. The touchpad device according to claim 1, wherein the first balancing bar has a first shaft and two first side bars, the two first side bars are respectively connected to two opposite ends of the first shaft, the substrate is provided with two first assembling members, the two first side bars are movably assembled on the two first assembling members, respectively, and a cushioning body is between each of the first assembling members and the inner surface of the touch panel.

15. The touchpad device according to claim 1, wherein the first balancing bar has a first shaft, the third balancing bar has a third shaft, and the first shaft of the first balancing bar is parallel to the third shaft of the third balancing bar.

16. The touchpad device according to claim 1, wherein the first balancing bar, the second balancing bar, the third balancing bar, and the fourth balancing bar surround the switch and are arranged radially.

17. The touchpad device according to claim 1, wherein the switch has an elastic resilient member, and the elastic resilient member contacts the substrate.

18. The touchpad device according to claim 1, wherein the first balancing bar, the second balancing bar, the third balancing bar and the fourth balancing bar are substantially the same size.

* * * * *